(12) United States Patent
Hayes (10) Patent No.: US 11,424,943 B2
(45) Date of Patent: *Aug. 23, 2022

(54) SYSTEM AND METHOD FOR INTERAPPLICATION COMMUNICATIONS

(71) Applicant: Verizon Patent and Licensing Inc., Basking Ridge, NJ (US)

(72) Inventor: Terry N. Hayes, Los Altos, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 251 days.

This patent is subject to a terminal disclaimer.

(21) Appl. No.: 16/818,564

(22) Filed: Mar. 13, 2020

(65) Prior Publication Data

US 2020/0220738 A1 Jul. 9, 2020

Related U.S. Application Data

(63) Continuation of application No. 15/713,549, filed on Sep. 22, 2017, now Pat. No. 10,630,491, which is a continuation of application No. 14/978,311, filed on Dec. 22, 2015, now Pat. No. 9,774,456, which is a continuation of application No. 14/337,048, filed on Jul. 21, 2014, now Pat. No. 9,225,533, which is a continuation of application No. 11/465,183, filed on Aug. 17, 2006, now Pat. No. 8,788,829.

(51) Int. Cl.
| | |
|---|---|
| *H04L 9/32* | (2006.01) |
| *G06F 9/54* | (2006.01) |
| *G06F 21/33* | (2013.01) |
| *G06F 21/44* | (2013.01) |
| *G06Q 10/10* | (2012.01) |
| *G06F 21/10* | (2013.01) |

(52) U.S. Cl.
CPC .............. *H04L 9/3271* (2013.01); *G06F 9/54* (2013.01); *G06F 21/105* (2013.01); *G06F 21/33* (2013.01); *G06F 21/445* (2013.01); *G06Q 10/107* (2013.01); *H04L 9/3247* (2013.01); *H04L 9/3268* (2013.01); *G06F 2221/0773* (2013.01)

(58) Field of Classification Search
CPC ....... H04L 9/32; H04L 9/3271; H04L 9/3247; H04L 9/3268; G06F 15/16; G06F 9/46; G06F 9/54; G06F 21/105; G06F 21/33; G06F 21/445; G06F 9/547; G06Q 10/107; G06Q 20/00; G06Q 20/02; G06Q 20/389; G07F 7/08; G07F 7/12
See application file for complete search history.

(56) References Cited

U.S. PATENT DOCUMENTS

| | | |
|---|---|---|
| 5,638,513 A | 6/1997 | Ananda |
| 5,878,144 A | 3/1999 | Aucsmith |
| 5,974,550 A | 10/1999 | Maliszewski |
| 6,112,250 A | 8/2000 | Appelman |
| 6,188,995 B1 | 2/2001 | Garst et al. |

(Continued)

*Primary Examiner* — Samson B Lemma (57) ABSTRACT

A first executable program on a computer system is enabled to exchange communications with a second executable program on the computer system by determining that the first executable program requests to exchange information with the second executable program, using the second executable program to challenge the first executable program for a digital certificate, and using the second executable program to exchange information with the first executable program when the digital certificate is verified.

20 Claims, 4 Drawing Sheets

(56) References Cited

U.S. PATENT DOCUMENTS

| | | |
|---|---|---|
| 6,389,536 B1 | 5/2002 | Nakatsuyama |
| 6,510,513 B1 | 1/2003 | Danieli |
| 6,615,347 B1 | 9/2003 | De Silva |
| 6,785,708 B1 | 8/2004 | Busey et al. |
| 6,965,994 B1 | 11/2005 | Brownell et al. |
| 7,043,050 B2 | 5/2006 | Yuval |
| 7,225,165 B1 * | 5/2007 | Kyojima ............... H04L 9/3249 |
| | | 705/52 |
| 7,231,523 B1 | 6/2007 | Mathiske |
| 7,340,600 B1 | 3/2008 | Corella |
| 7,529,929 B2 | 5/2009 | Asokan et al. |
| 7,742,992 B2 | 6/2010 | Cronce |
| 7,743,248 B2 | 6/2010 | Bisbee |
| 7,925,898 B2 | 4/2011 | Shear et al. |
| 8,358,778 B2 * | 1/2013 | Landrock ............... H04L 9/3247 |
| | | 380/28 |
| 8,875,300 B1 * | 10/2014 | Miller ..................... G06F 9/545 |
| | | 726/26 |
| 2003/0069923 A1 | 4/2003 | Peart |
| 2003/0012658 A1 | 7/2003 | Teramoto et al. |
| 2003/0156719 A1 | 8/2003 | Cronce |
| 2003/0172035 A1 * | 9/2003 | Cronce .................. G06Q 30/06 |
| | | 705/59 |
| 2004/0068650 A1 | 4/2004 | Resnitzky et al. |
| 2004/0093505 A1 | 5/2004 | Hatakeyama et al. |
| 2004/0127196 A1 | 7/2004 | Dabbish et al. |
| 2005/0120214 A1 * | 6/2005 | Yeates ..................... H04L 63/08 |
| | | 713/171 |
| 2005/0125668 A1 | 6/2005 | Botz |
| 2006/0005256 A1 | 1/2006 | Cox |
| 2006/0059099 A1 * | 3/2006 | Ronning ............. G06Q 20/1235 |
| | | 705/59 |
| 2006/0080527 A1 | 4/2006 | Novack et al. |
| 2007/0067630 A1 | 3/2007 | Lenkov et al. |

* cited by examiner

SYSTEM AND METHOD FOR INTERAPPLICATION COMMUNICATIONS

CROSS-REFERENCE TO RELATED APPLICATION(S)

This patent application is a continuation of U.S. patent application Ser. No. 15/713,549 filed on Sep. 22, 2017 which is a continuation of U.S. patent application Ser. No. 14/978,311 filed Dec. 22, 2015, now U.S. Pat. No. 9,774,456, which is a continuation of U.S. patent application Ser. No. 14/337,048 filed Jul. 21, 2014, now U.S. Pat. No. 9,225,533, which is a continuation of U.S. patent application Ser. No. 11/465,183 filed Aug. 17, 2006, now U.S. Pat. No. 8,788,829, the disclosures of which are expressly incorporated herein by reference in their entireties.

TECHNICAL FIELD

This document relates to executable programs.

BACKGROUND

A user may rely on multiple programs in accessing the Internet. For example, a user may access an electronic mail application to send electronic mail, a web browser to access Internet content, and an Instant Messaging application to exchange real-time communications.

SUMMARY

In one general sense, a first executable program on a computer system is enabled to exchange communications with a second executable program on the computer system by determining that the first executable program requests to exchange information with the second executable program. The second executable program is used to challenge the first executable program for a digital certificate and exchange information with the first executable program when the digital certificate is verified.

Implementations may include one or more of the following features. For example, using the second executable program to exchange communications may include exchanging the communications in response to a user independently launching both the first and second executable programs in separate launch operations. Using the second executable programs to exchange communications may include using a subprogram within the first executable program to exchange information with the second executable program or a second executable program subprogram.

Determining that the first executable programs requests to exchange information may include using an Interprocess Communications Call (IPC) call in the first executable program that references the second executable program or a subprogram within the second executable program. Using the IPC call may include using one or more parameters in the IPC call to exchange a digital certificate.

In another general sense, communications between a first executable program and a second executable program may be certified by initiating a connection between the first executable program and the second executable program, identifying the first executable program to the second executable program by sending a digital certificate for the first executable program to the second executable program, using the second executable program to verify that the digital certificate is valid, using the second executable program to generate and transmit a challenge value to the first executable program, using the first executable program to sign the challenge value, sing the second executable program to verify the challenge value, and when the second executable program verifies the challenge value, establishing the connection so that the second executable program may respond to requests received through the connection.

Implementations may include the following and other features. For example, sending the digital certificate for the first executable program may include transmitting that digital certificate that relates to a name and a copyright notice.

In another general sense, communications between a first executable program and a second executable program may be certified by using a first executable program to generate a request to a second executable program, using the first executable program to operate on data associated with the request, using the first executable program to transmit the signed data to the second executable program, using the second executable program to receive the signed data, using the second executable program to verify the signed data, using the second executable program access a key for the first executable program, using the key to verify the signed data, and when the request is verified, using the second executable program to support the request.

Implementations may include the following and other features. For example, using the first executable program to operate on data associated with the request may include using the first executable program to sign and encrypt a message digest of a license agreement provided by the second executable program.

DETAILED DESCRIPTION

Application developers may invest a great deal of energy, time, and resources in developing applications. An application developer may elect to retain some degree of control over how the applications may be used to preclude others from improperly using the application.

For example, an application developer may develop a messaging executable program (e.g., electronic mail messaging, instant messaging, and/or a directory services with an address book). The application developer may attempt to preclude other application providers from interfacing with the messaging executable program by using digital certificates to certify interoperable communications. For instance, an unauthorized developer may develop an instant messaging program that interfaces with an address book program in violation of a licensing agreement for the address book program.

To reduce the likelihood of an executable program being used in an unauthorized manner, the application developer may use digital certificates in interapplication, intradevice communications. When a first executable program running on a first computer system attempts to exchange information with a second executable program running on the first computer system, the second executable program may challenge the first executable program for a digital certificate. Unless a valid digital certificate is exchanged, the first computer system may preclude the first executable program from exchanging information with the second executable program.

The digital certificate may be copyrighted so that in addition to violating a licensing agreement, the digital certificate may be violating the intellectual property rights of the copyright owner.

The digital certificates may be enrolled in a digital certificate management system. In one implementation, use of the digital certificates is reported to the digital certificate management program (residing on the same or different computer system than the first and second executable programs). A report may be generated indicating which executable programs are using or have used a digital certificate. More particularly, the report may indicate the identity of which certificate has been used by which executable program. In another implementation, the digital certificates are periodically changed to reduce the likelihood of the digital certificates being wrongfully appropriated.

Figure 1:
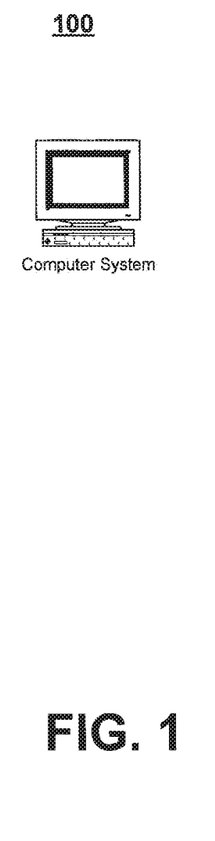
FIG. 1 is a block diagram of a computer system with two executable programs that exchange digital certificates to certify interapplication communications.

FIG. 1 is a block diagram of a computer system 100 with two executable programs (not shown) that may exchange digital certificates to certify interapplication communications.

The computer system 100 typically includes a computer system running multiple executable programs and may enable a user to exchange information over a computer network. The computer system 100 may include one or more devices capable of accessing content residing on a host. The computer system 100 may include a controller (not shown) that processes instructions received from or generated by a software application, a program, a piece of code, a device, a computer, a computer system, or a combination thereof, which independently or collectively direct operations of the computer system 100. The instructions may be embodied permanently or temporarily in any type of machine, component, equipment, storage medium, or propagated signal that is capable of being delivered to the computer system 100 or that may reside with the controller at computer system 100.

Computer system 100 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the computer system 100 includes one or more information retrieval software applications (e.g., a browser, a mail executable program, an instant messaging computer system, an Internet service provider computer system, or an AOL TV or other integrated computer system) capable of receiving one or more data units. The information retrieval applications may run on a general-purpose operating system and a hardware platform that includes a general-purpose processor and specialized hardware for graphics, communications and/or other capabilities. In another implementation, computer system 100 may include a wireless telephone running a micro-browser application on a reduced operating system with general purpose and specialized hardware capable of operating in mobile environments.

The computer system 100 may include one or more media applications. For example, the computer system 100 may include an executable program that enables the computer system 100 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The computer system 100 may enable interapplication communications using digital certificates. For example, the computer system 100 may include an address book executable program that interfaces with an electronic mail messaging executable program and/or instant messaging executable program by presenting digital certificates.

The executable programs on the computer system 100 may include a security code segment configured to perform one or more cryptographic operations. The security code segment may be configured to perform symmetric and asymmetric cryptographic operations.

In one implementation, a first executable program uses a security code segment in conjunction with a library of keys (e.g., a public key) in a communications session with another other executable program.

The security code segment may be configured to determine a digital signature (e.g., use a key to encrypt a block of data and perform a cryptographic hash on the encrypted block of data), generate a digital certificate, and/or verify a digital certificate. The security code segment may establish encrypted communications with another executable program.

In one implementation, the security code segment is embedded within the first executable program. In another implementation, the security code segment is configured as a separate executable program that is referenced or invoked to perform a cryptographic operation by a user executable program such as an electronic mail messaging executable program.

An executable program within the computer system 100 may be configured to exchange or verify a digital certificate with another executable program. For example, a digital certificate may be presented so that a first executable program may use interprocess communication (IPC) to exchange data with a second executable program. The digital certificate may be embedded within a first executable program, generated dynamically, or invoked by accessing a third party code segment. In one implementation, a digital certificate is accessed through a certificate authority (CA) administered by an operating system.

The security code segment may update key and/or certificate information. For example, the computer system may periodically update a digital certificate from a network-based host configured to provide certificate updates.

The security code segment may participate in a reporting system indicating which executable programs are using which keys and/or certificate. For example, the computer 100 may track which executable programs are using which keys and/or certificates. The computer then may report certificate usage by the executable programs to a network-based reporting authority. The reporting authority then may analyze the certificate used to identify which executable programs are using which digital certificates. The digital certificates may be copyrighted, so analyzing the certificate usage may assist in identifying copyright violators.

The location for the digital certificates in memory may be monitored so that the computer may identify one or more programs attempting to access the digital certificate, which may include a malicious user attempting to circumvent a digital certificate system.

The monitoring code segment may identify which executable programs are accessing the digital certificate in memory, and report the digital certificate usage.

The digital certificates may be protected by an access control or 'armored' operating system or controller regulating how different executable programs may access other executable programs. For example, an armored controller may regulate how digital certificates within a suite of programs may be used, or which executable programs may exchange content with other executable programs.

Figure 2:
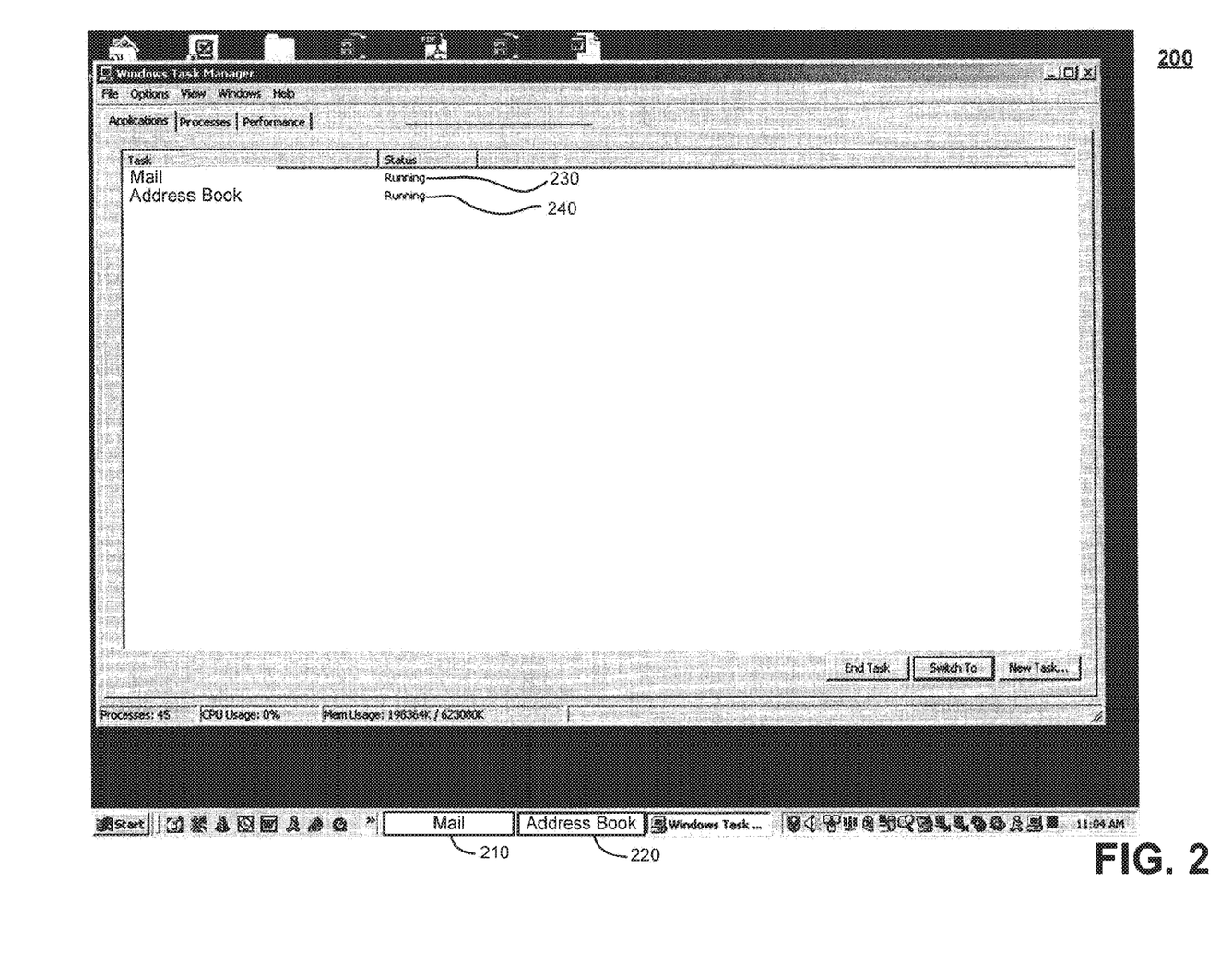
FIG. 2 is an exemplary graphical user interface showing two executable programs that may exchange digital certificates to certify interapplication communications.

FIG. 2 is an exemplary graphical user interface (GUI) 200 showing two executable programs that may exchange digital certificates to certify interapplication communications.

For convenience, particular components and messaging formats described earlier are referenced as performing the process. However, similar methodologies may be applied in other implementations where different components are used to define the structure of the system, or where the functionality is distributed differently among the components shown.

GUI 200 shows a first executable program 210 and a second executable program 220 that appear in a task bar for a Windows™ desktop. In the GUI 200 shown, the first executable program 210 includes an electronic mail messaging executable program, and the second executable program 220 is an address book executable program 220. GUI 200 also shows a task manager that indicates a first application task 230 and a second application task 240, where the application task relates to the first and second executable programs that are running. Note that while portions of the GUI 200 relate to a Windows operating system, the systems, techniques and operations described in this document may be used on other devices (e.g., a wireless phone, a Personal Digital Assistant, a server, and/or a set top system) and in other environments (e.g., Linux, OS X, Apple's operating system (e.g., OS X)).

Generally, the first executable program 210 and the second executable program 220 relate to two different executable programs that a user may invoke or run. For example, the first and second executable programs may end in a .exe extension indicating that the program may operate as an executable code segment. Note that while the first executable program 210 and the second executable program 220 may exchange information using digital certificates, each of the executable programs is capable of running independently without requiring the other executable program to execute, or be invoked.

In one implementation, the first and second executable programs are each invoked independently. For instance, a user may select a short cut residing in a desktop that launches the executable program. Alternatively, a user may select a graphical representation appearing in a menu such as the "Start" menu.

In a second implementation, the first executable program 210 may invoke a second executable program 220, where a user has not expressly invoked the second executable program. For example, a user may elect to launch an electronic mail messaging executable program (e.g., by pressing on a shortcut that launches a program named mail.exe). The electronic mail messaging executable program then may invoke an address book executable program (e.g., by generating a command that launches address_book.exe). The first and second executable programs then may exchange information using digital certificates to certify the exchange of information. For instance, a mail program may retrieve address information from an address book program. Alternatively, an electronic mail message may be generated from an address book program by invoking the electronic mail messaging program from the address book.

In one implementation, the first and second executable programs are executable programs launched or invoked by a user. For instance, the first and second executable programs may include programs operating in a Windows™ environment with .EXE extensions. The executable programs may be represented, accessed, or launched through a shortcut appearing on a desktop, or an icon appearing in a START menu. The first and second executable programs may be launched when a user selects a control to launch the executable program. In another implementation, the executable programs may be launched by a third executable program or a batch file that launches the first and/or second executable program(s) so that the third executable program may exchange information with the first and/or second executable program.

Figure 3:
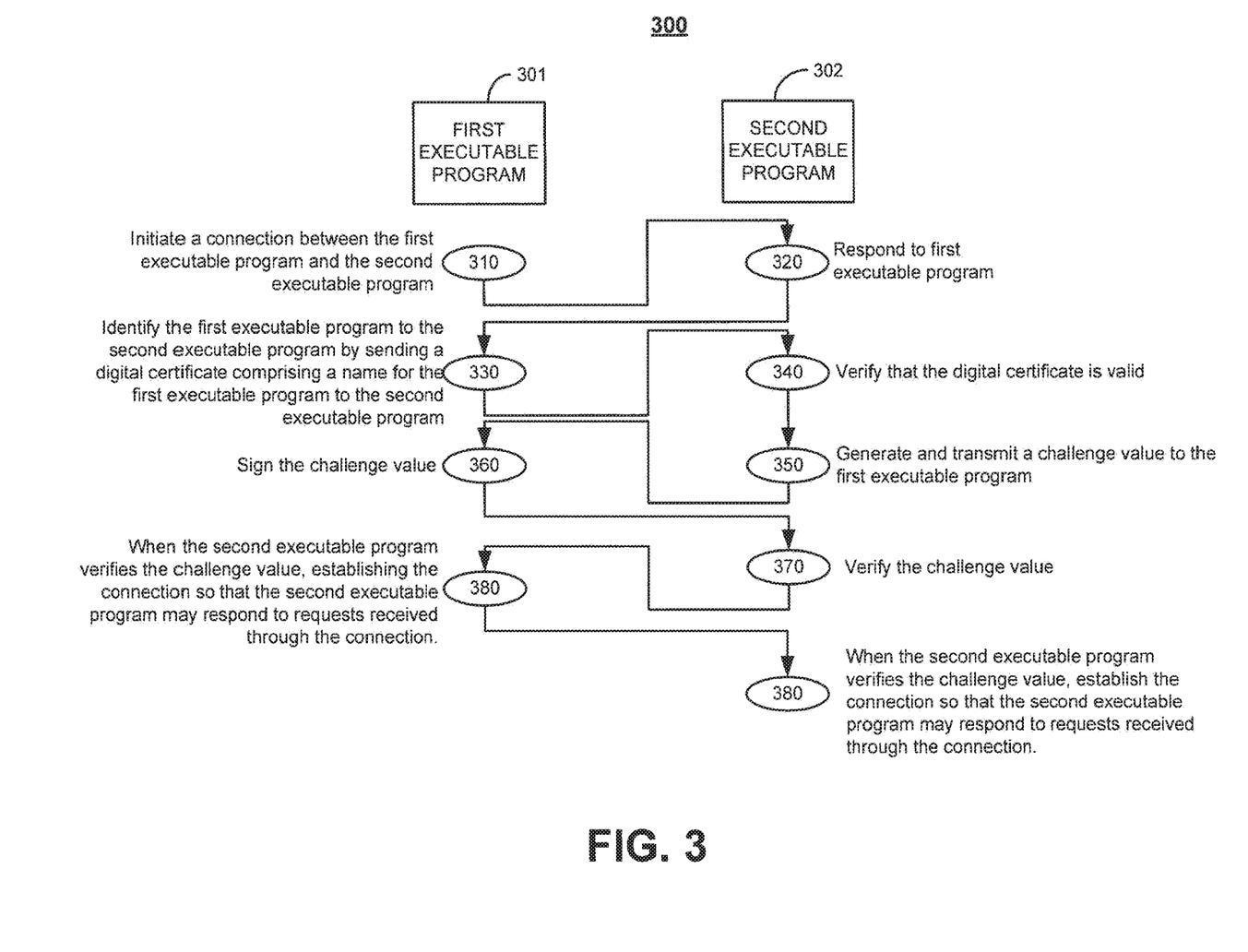
FIG. 3 is a flow chart of an exemplary process by which two executable programs may exchange digital certificates to certify interapplication communications.

FIG. 3 is a flow chart 300 of an exemplary process by which two executable programs may exchange digital certificates to certify interapplication communications. For convenience, particular components and messaging formats described earlier are referenced as performing the process. However, similar methodologies may be applied in other implementations where different components are used to define the structure of the system, or where the functionality is distributed differently among the components shown.

The first executable program 301 initiates a connection between the first executable program 301 and the second executable program 302 (310), which in turn responds to the first initiating program (320). For example, a user accessing an electronic mail messaging program may access an address book executable program to insert recipients into the address portion of an electronic mail message.

The first executable program 301 identifies the first executable program 301 to the second executable program 302 by sending a digital certificate for the first executable program to the second executable program (330). Sending a digital certificate may include sending a name, process identifier, copyright notice, or other information that is presented and used to certify interapplication communications. The information in the certificate then may be encrypted, with a value determined by a cryptographic hash determined. The second executable program 302 verifies that the digital certificate is valid (340), and generates a challenge value to the first executable program 301 (350).

The first executable program 301 signs the challenge value (360), which the second executable program 302 then verifies (370). When the second executable program verifies the challenge value, the first executable program establishes a connection so that the second executable program may respond to requests received through the connection (380).

Figure 4:
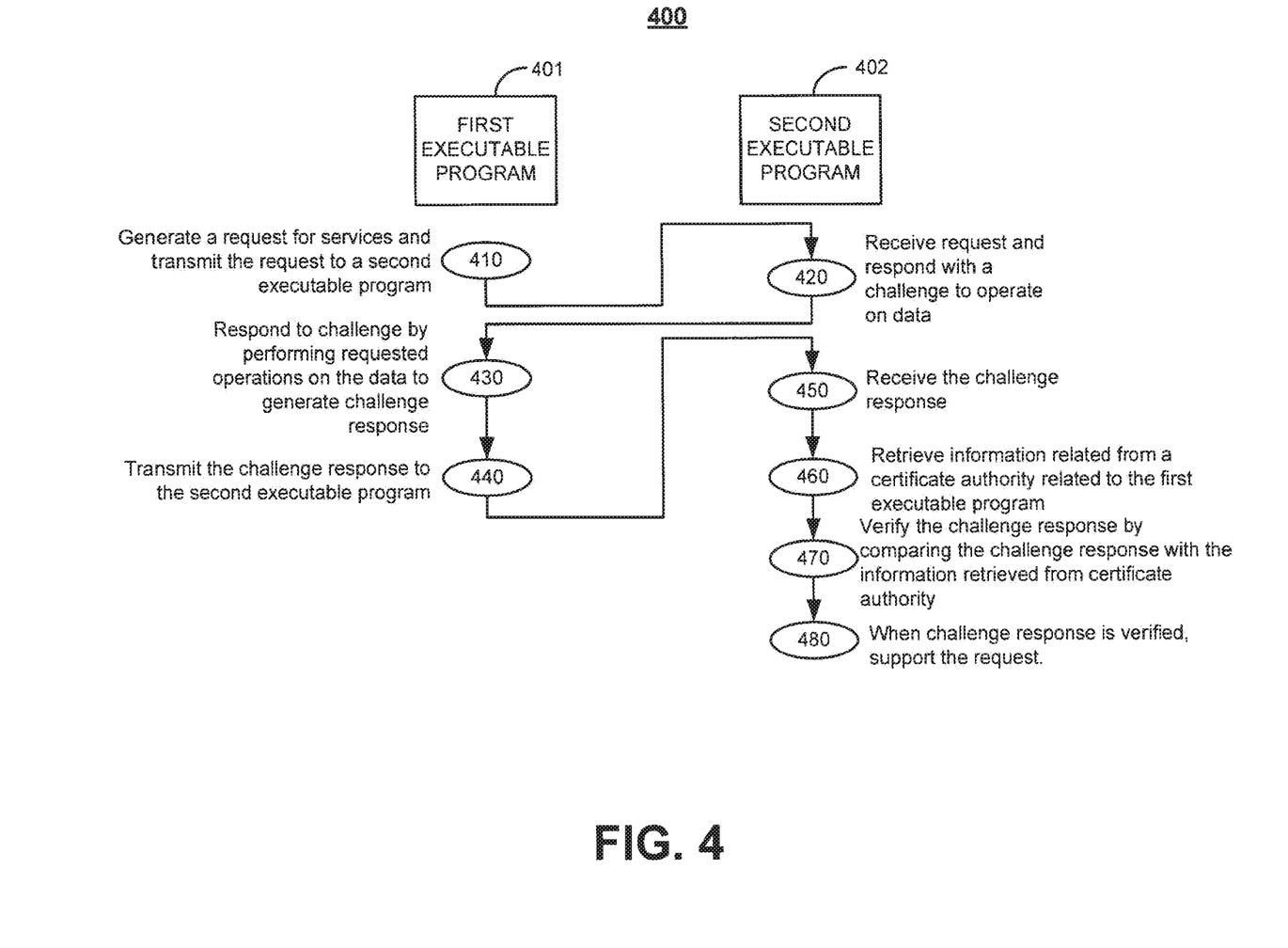
FIG. 4 is a flow chart of an exemplary process by which two executable programs may exchange digital certificates using a request.

FIG. 4 is a flow chart 400 of an exemplary process by which two executable programs may exchange digital certificates on a per request basis. For convenience, particular components and messaging formats described earlier are referenced as performing the process. However, similar methodologies may be applied in other implementations where different components are used to define the structure of the system, or where the functionality is distributed differently among the components shown.

The first executable program 401 generates a request for services from a second executable program 402 and transmits the request to the second executable program 402 (410).

For example, the first executable program 401 may use an IPC (Inter Process Communications) Call to retrieve information from the second executable program 402. In one implementation, the first executable program 401 represents a messaging application attempting to call an address book application. The second executable program 402 receives the request and responds with a challenge to operate on data (420). For example, the second executable program 402 may instruct the first executable program to perform identity verification operations on the data. In one configuration, the second executable program 402 instructs the first executable program to perform cryptographic operations on a license agreement with copyright provisions. Exemplary cryptographic operations may include instructing the first executable program to sign a message digest of the license agreement with a private key for the first executable program.

The first executable program 401 responds to the challenge by performing the requested operations on the data to generate a challenge response (430). The first executable program 401 transmits the challenge response to the second executable program (440). For example, the first executable program may transmit an encrypted message digest of a license agreement to the second executable program 402 to prevent (or reduce the likelihood of) the first executable program (or an author of the first executable program 401) from repudiating knowledge of a licensing agreement.

The second executable program 402 receives the challenge response (450). The second executable program 402 then retrieves information from a certificate authority related to the first executable program (460). In one implementation, referencing the information includes accessing a certificate authority that resides on a certificate server external to the computer system hosting the first executable program 401 and the second executable program 402. In another implementation, referencing the information includes accessing a certificate authority within the computer system hosting the first executable program 401 and the second executable program 402. For example, the computer system may operate a certificate authority for executable programs on the computer system to access. In yet another implementation, referencing the information includes accessing a certificate authority within the first executable program 401.

The second executable program 402 verifies the challenge response by comparing the challenge response with the information retrieved from the certificate authority (470). In one implementation, the second executable program 402 retrieves a certificate for the first executable program from the certificate authority, and extracts a public key from the digital certificate for the first executable program. The second executable program 402 then accesses the message digest of a license agreement. The message digest then is compared to the message digest provided by the first executable program 401 as a result of challenge response, for example, by using the public key provided by the certificate authority to decrypt the challenge response. If the message digests are identical, then confidence in the identity of the first executable program can be established. As a result, when the challenge response is verified, the request is supported (480). For example, an address book application may enable a message application to retrieve address information.

Other implementations are within the scope of the following claims. For example, although the operations described a first executable program exchanging a digital certificate with a second executable program, a subprogram within the first executable program may exchange a digital certificate with the second executable program or a subprogram within the second executable program.

While the two executable programs are illustrated as running in a desktop environment, running a first second executable program on a computer system may include initially only running a first executable program. The first executable program then may determine that information should be exchanged with a second executable program. The computer system then may launch the second executable program so that the first executable program then may exchange information with the second executable program. The second executable program may be configured to completely 'activate' or launch in response to receiving a launch instruction from the first executable program so that the second executable program may receive an IPC call and support the IPC call when the appropriate digital certificate is presented.

Alternatively, the first executable program may launch a compact instance or gateway portion of the second executable program where the compact instance/gateway portion of the second executable program challenges the first executable program to present the appropriate certificate. The compact instance/gateway portion may feature a reduced footprint (e.g., consume less memory and/or processing resources than the full second executable program) to reduce the likelihood that the second executable program is not be improperly exploited. Although many of the operations were described with respect to a certificate authority, other implementations may include executable programs with pre-populated keys that do not require the use of a certificate authority.

What is claimed is:

1. A computer implemented method for enabling a first executable program on a computer system to exchange communications with a second executable program on the computer system, the method comprising:

determining that the first executable program requests to exchange information with the second executable program;

using the second executable program to challenge the first executable program for a first digital certificate;

using the second executable program to exchange information with the first executable program when the first digital certificate is verified; and after exchanging the information and determining that the first certificate has not been changed for a predetermined period of time, transmitting a second digital certificate to the first executable program and the second executable program.

2. The computer implemented method of claim 1, further comprising:

receiving a report indicating the use of a first digital certificate by a second executable program to authorize a first executable program to exchange copyright notice, identity, and cryptographic hash information with the second executable program.

3. The computer implemented method of claim 2, wherein the report further indicates an identity of one or more subprograms within at least one of the first executable program and the second executable program.

4. The computer implemented method of claim 2, wherein the at least one processor further performs the following operation: forwarding the received report to the network-based host.

5. The computer implemented method of claim 2, wherein the implementation of the cryptographic hash is one of an asymmetric or symmetric operation.

6. The computer implemented method of claim 2, further comprising:
   determining whether the first executable program and the second executable program are authorized to exchange content based on the exchanged copyright notice, identity, and cryptographic hash information.

7. The computer implemented method of claim 1, wherein using the second executable program to exchange communications includes exchanging the communications in response to a user independently launching both the first and second executable programs in separate launch operations.

8. A system for enabling a first executable program on a computer system to exchange communications with a second executable program on the computer system, the system comprising:
   at least one processor; and
   a memory storing executable instructions that, when executed by the at least one processor, causes the at least one processor to perform the following operations:
   determining that the first executable program requests to exchange information with the second executable program;
   using the second executable program to challenge the first executable program for a first digital certificate;
   using the second executable program to exchange information with the first executable program when the first digital certificate is verified; and
   after exchanging the information and determining that the first certificate has not been changed for a predetermined period of time, transmitting a second digital certificate to the first executable program and the second executable program.

9. The system of claim 8, wherein the at least one processor is further configured for:
   receiving a report indicating the use of a first digital certificate by a second executable program to authorize a first executable program to exchange copyright notice, identity, and cryptographic hash information with the second executable program.

10. The system of claim 9, wherein the report further indicates an identity of one or more subprograms within at least one of the first executable program and the second executable program.

11. The system of claim 9, wherein the at least one processor further performs the following operation: forward the received report to the network-based host.

12. The system of claim 9, wherein the implementation of the cryptographic hash is one of an asymmetric or symmetric operation.

13. The system of claim 9, further comprising:
   determining whether the first executable program and the second executable program are authorized to exchange content based on the exchanged copyright notice, identity, and cryptographic hash information.

14. The system of claim 8, wherein using the second executable program to exchange communications includes exchanging the communications in response to a user independently launching both the first and second executable programs in separate launch operations.

15. A tangible, non-transitory computer-readable medium storing instructions that, when executed by at least one processor, cause the at least one processor to perform operations comprising:
   determining that the first executable program requests to exchange information with the second executable program;
   using the second executable program to challenge the first executable program for a first digital certificate;
   using the second executable program to exchange information with the first executable program when the first digital certificate is verified; and
   after exchanging the information and determining that the first certificate has not been changed for a predetermined period of time, transmitting a second digital certificate to the first executable program and the second executable program.

16. The tangible, non-transitory computer-readable medium of claim 15, storing instructions that, when executed by at least one processor, cause the at least one processor to perform operations comprising:
   receiving a report indicating the use of a first digital certificate by a second executable program to authorize a first executable program to exchange copyright notice, identity, and cryptographic hash information with the second executable program.

17. The tangible, non-transitory computer-readable medium of claim 16, wherein the report further indicates an identity of one or more subprograms within at least one of the first executable program and the second executable program.

18. The tangible, non-transitory computer-readable medium of claim 16, wherein the at least one processor further performs the following operation: forward the received report to the network-based host.

19. The tangible, non-transitory computer-readable medium of claim 16, wherein the implementation of the cryptographic hash is one of an asymmetric or symmetric operation.

20. The tangible, non-transitory computer-readable medium of claim 16, further comprising:
   determining whether the first executable program and the second executable program are authorized to exchange content based on the exchanged copyright notice, identity, and cryptographic hash information.

* * * * *